United States Patent [19]
Hiroshi et al.

[11] 3,929,757
[45] Dec. 30, 1975

[54] METHOD FOR THE PREPARATION OF HIGH PURITY KALLIKREIN

[75] Inventors: Miyazakai Hiroshi, Kawasaki; Kato Kazuo, Tokyo; Koyama Michinori, Tokyo, all of Japan

[73] Assignee: Nippon Kayaku Co., Ltd., Tokyo, Japan

[22] Filed: May 15, 1974

[21] Appl. No.: 470,229

[30] Foreign Application Priority Data
May 17, 1973  Japan................................ 48-54136

[52] U.S. Cl............................................ 260/112.5 R
[51] Int. Cl.² .................. C07C 103/52; C08H 1/00
[58] Field of Search................................ 260/112.5

[56] References Cited
UNITED STATES PATENTS

| | | | |
|---|---|---|---|
| 3,181,997 | 5/1965 | Schultz | 260/112.5 |
| 3,558,773 | 1/1971 | Schultz | 260/112.5 |
| 3,798,205 | 3/1974 | Werle et al. | 260/112.5 |
| 3,830,790 | 8/1974 | Rauenbusch et al. | 260/112.5 |
| 3,830,791 | 8/1974 | Golker | 260/112.5 |

*Primary Examiner*—Lewis Gotts
*Assistant Examiner*—Reginald J. Suyat
*Attorney, Agent, or Firm*—Russell & Nields

[57] ABSTRACT

This invention relates to a method for the preparation of high purity kallikrein, and more particularly, to a method for preparing high purity kallikrein from an autolysate, which is obtained from organs of mammals, human urine or a low purity kallikrein-containing solution by the use of a highly cross-linked macro-porous type anion exchange resin having a tertiary amine as an exchange group.

4 Claims, 2 Drawing Figures

FIG. I
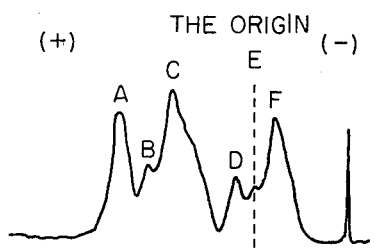
JAPANESE
PAT. NO. 130506
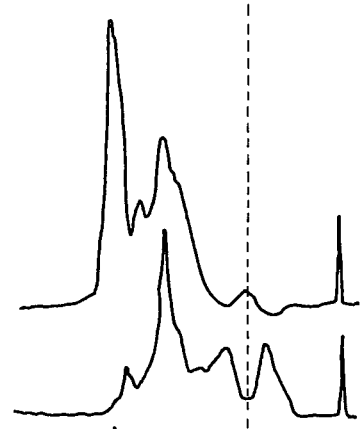
JAPANESE
PAT. NO. 404256
AUTOLYSATE
PRESENT INVENTION
EXAMPLE 6
PRESENT INVENTION
EXAMPLE 7

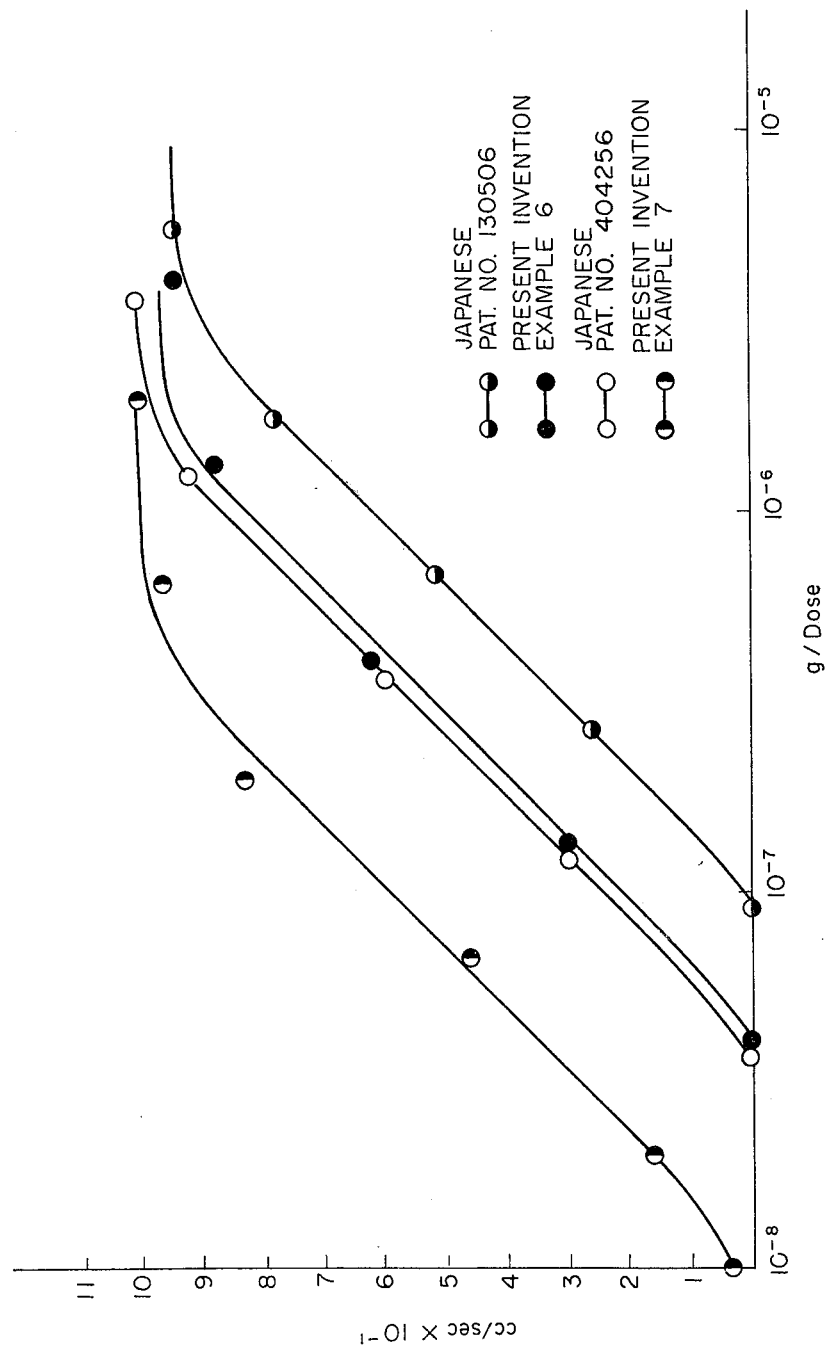

METHOD FOR THE PREPARATION OF HIGH PURITY KALLIKREIN

BACKGROUND OF THE INVENTION

Kallikrein which has a telangiectatic action is a protein which is obtained from the pancreas, a submaxillary gland, urine or blood of mammal origin, and is effective for curing circulatory organ troubles. Kallikrein ordinarily serves as an injection or oral medicine.

With a medicine which is directly injected into a human body, its quality is an important factor in evaluating the safety of the medicine and it should be ensured that the medicine be of an extremely high purity without admixture of any impurity.

In this connection, however, since kallikrein is extracted or collected from organs of animals, it is difficult to completely separate the effective kallikrein protein from other undesirable proteins which are similar to kallikrein in various properties.

If an injection containing such impurities is given to a human body over a time period required for therapeutical purposes, the foreign proteins might cause serious side effects such as an antigen-antibody reaction.

Accordingly, there have been proposed various methods for the purification of kallikrein.

In order to develop a method for extracting, isolating and purifying kallikrein on an industrial scale and in high purity sufficient to ensure its safety as a medicine, the present inventors have prepared kallikrein in accordance with wellknown processes as described, for example, in Japanese Pat. Nos. 130506 and 404256 to serve as raw kallikrein in subsequent impurity-separation tests. More particularly, various components of the raw kallikrein were separated by an electrophoresis method using a cellulo-gel film consisting of pure celluloseacetate and having a fine porous structure and the separated components were subjected to extraction for isolating an effective component in accordance with pharmacological tests. As a result, it was found that: when determined by the cellulogel film electrophoresis method, an effective component (hereinafter referred to as component A) was transferred more closely to the anode and showed Rm value similar to that of human serum albumin; three components (hereinafter referred to as component B, component C and component D, respectively), which were intermediated between the component A and the origin E, and the origin E were migrated toward the cathode; and a component (hereinafter referred to as component F) which showed Rm value similar to that of trypsin was foreign proteins which did not show such pharmacological actions as kallikrein.

Furthermore, it was found that, when each protein was dyed with Red. No. 502, Ponceau-3R (i.e., disodium salt of 1-pseudocumylazo-2-naphthol-3.6-disulfonic acid) for determination of the amount of the respective proteins by the use of a densitometer, the total amount of the foreign proteins B, C, D, E and F was several times greater than the amount of the protein A (See FIG. 1).

As is apparent from the foregoing, it is impossible to separate and purify an effective component of kallikrein with the prior processes.

When the above discriminating method was applied to commercially available medicines which showed medical actions of or similar to kallikrein, all products tested were found to contain the components or proteins B, C, D and E, and some contained even the component F as impurity.

This clearly shows how difficult the removal of pharmacologically ineffective foreign proteins from such products is on an industrial scale.

The prior processes have not only the vital drawbacks in separation capability mentioned above, but also cannot be suitably adopted as an industrial purification process in any of the following operational procedures. That is, the kallikrein precipitation process using a water-soluble organic solvent (Japanese Pat. No. 130506) aims at separation of proteins from lipides and is incapable of further separating effective components from foreign proteins. Accordingly, the process plays merely a role of a pretreatment, with possibilities of denaturating proteins by the action of the organic solvent and inactivating or deteriorating the pharmacological activity of kallikrein per se.

Japanese Pat. No. 404256 describes a method for the purification of kallikrein using a cellulose having basic substituents. However, it is considered impossible to directly apply to the cellulose resin an autolysate of animal organs and/or human urine, which contains a large amount of impurities. Thus, it is disadvantageously required to pretreat the autolysate and/or urine, and the cellulose resin has weak physical properties in toughness, so that it cannot be used repeatedly. Moreover, the cellulose resin is easily clogged with solid components of the autolysate or human urine, which co-exist in an extract due to their fine particle size, so that the elution will become very difficult, resulting in obstruction of operations. Thus, this method cannot be applied on an industrial scale for the production of kallikrein.

The present inventors have conducted an extensive study in order to find a method for the preparation of highly pure kallikrein which can overcome the above-mentioned disadvantages and by which high purity kallikrein can be produced on an industrial scale at low production costs. That is, various kinds of ion exchange resins which are considered to be advantageous due to their excellent durability, low cost and easeness of handling were subjected to the above-mentioned discrimination tests for a determination of their adsorption power for kallikrein and for selection of a washing and an eluate for the suitable separation or removal of impurities. In this instance, when a pancreas and autolysate of pigs were employed as a starting material and treated by an ion exchange resin, Amberlite IR-45 (Registered Trade Mark of Rohm & Haas Co.) which is a basic resin of a polystyrenebase polyamine type, 13% of the total amount of the effective component was lost during adsorption and washing. Furthermore, when the absorbed substance was eluted by means of an eluant, the effective component could be collected in an amount as large as 55% of the total amount thereof but the resultant eluate also contained impurities B, C, D, E and F. Furthermore, when Dowex 44 (Registered Trade Mark of Dow Chemical Co.) which is porous resin containing a tertiary amine as its exchange group was used for adsorption, 73% of the total amount of the effective component was lost during adsorption and washing. With Diaion WA-21 (Registered Trade Mark of Mitsubishi Chemical Industries Co.) which is of a macro-porous type and which contains primary and secondary amines, the loss due to unadsorption and washing was only 2% of the total amount of the effective component, but only 50% of the total effective component could be eluted even with eluants of different kinds and concentrations. Additionally, the resultant eluate contained the components B and C as in the Amberlite IR-45. Furthermore, with Dowex 1 (Registered Trade Mark of Dow Chemical Co.) which is a styrene-divinylbenzene copolymer containing a quaternary amine as its main exchange group, 60% of the total effective component was lost by adsorption failure and by washing.

Furthermore, when an ion exchange resin which is porous resin containing a quaternary amine as its exchange group, for example Amberlite IRA 904 (Registered Trade Mark for a highly cross-linked macro-porous type exchange resin having a quaternary ammonium salt as an exchange group, manufactured by Rohm & Haas, Co.), Amberlite IRA 938 (this resin is also manufactured by Rohm & Haas Co. and has the same characters as that of Amberlite IRA 904) and Amberlite IRA 900 (this resin is also manufactured by Rohm & Haas Co. and has the same characters as that of Amberlite 904), was used for adsorption, 100% of the total amount of the effective component was adsorbed.

However, the respective recoveries of the effective component after elution were 23.4, 91.8 and 98.0%, and while the same kind of resins were employed the recoveries given were not constant.

Moreover, the purity of kallikrein obtained by the said resins was not improved to a great extent, since the respective specific activities of resultant kallikreins were only 0.48, 1.04 and 1.21, when that of the starting kallikrein was reckoned as 1.

Accordingly, the purification of kallikrein by the above resins was of no remarkable merit in comparison with the prior art processes.

BRIEF DESCRIPTION OF THE DRAWING(S)

The invention may be best understood by the following detailed description thereof having reference to the accompanying drawings in which;

FIG. 1 is a graphical pattern obtained by measuring in a densitometer two different kinds of kallikrein of Examples 6 and 7 of the present invention and two different kinds of kallikrein obtained by the processes of Japanese Pat. No. 130,506 and 404,256, after electrophoresis using a cellulo-gel film and dyeing and protein concentrations are determined by means of a densitometer; and FIG. 2 is a graphical pattern obtained by measurements of variations in increase in blood flow rate of dogs, by a hind leg blood circulation method, with the use of four kinds of kallikrein which are obtained in accordance with Examples 6 and 7 of the present invention and the process of Japanese Pat. Nos. 130506 and 404256.

DETAILED DESCRIPTION OF THE PREFERRED EMBODIMENT

Thus, the separation of kallikrein with use of an ion exchange resin was considered unsuitable. However, it has been unexpectedly found, as a result of further investigations, that, when Diaion WA30 (Registered Trade Mark of Mitsubishi Chemical Industries Co.) which is a styrene-divinylbenzene copolymer similar to Diaion WA21 and which is of a highly cross-linked macro-porous type having a tertiary amine as an exchange group is used, only 1.28% of the total effective component was lost during adsorption and washing, and 95% of the total effective component was obtained by elution with an eluant.

When the specific activity of the starting kallikrein was reckoned as 1, that of the resulting kallikrein was in the range of 2 to 5. The said resin remarkably increased the purity of kallikrein. The same results were obtained when Imac A 20R (Registered Trade Mark of Imacti Industriele Maatschappij Actvit N.V.) which has the same structure as Diaion WA-30, i.e., a highly cross-linked macro-porous type containing a tertiary amine as its main exchange group, was used for the same purposes. That is, the effective component was not lost during adsorption and washing operations and 95% of the total effective component was eluted by means of an eluant. To our great surprise, when the resultant kallikrein was subjected to a cellulo-gel film electrophoresis analysis, almost all of the kallikrein was of the effective component A with impurities B and C being only in an amount of 4% (see Curve 6 of FIG. 1). The purity or a specific activity of the component A reached as high as 20.81 – 43.072 ku/mg.

The separation of kallikrein using this type of ion exchange resin is therefore considered extremely efficient and industrially excellent in comparison with the prior art processes, e.g., kallikrein which is obtained by the prior precipitation process using acetone has a specific activity or purity of only 4.47 – 13.59 ku/mg.

FIG. 1 is a graphical representation showing the amount of the effective component in relation to the amount of impurities in various samples prepared in the following manner. Two kinds of kallikrein which are obtained by the process of Japanese Pat. Nos. 130506 and 404256, an autolysate of animal organs used in the present invention, and two kinds of kallikrein which are obtained according to Examples 6 and 7 of the present application, are each dissolved in distilled water and the resultant solutions are deposited upon a cellulo-gel film having a size of 12 × 12 cm, followed by electrophoresis with the use of a 0.07 M Vernal buffer solution (having a pH value of 8.6) under application therethrough of 0.63 mA/cm of a constant current for 2.5 hours. After completion of the electrophoresis, the cellulo-gel film is dyed with Ponceau 3R and decolorized to make the film partially transparent. Then, the protein-dyed portions which are dyed with Ponceau-3R on the cellulo-gel film are analyzed by the use of a densitometer (using a filter of 500 nm, and a slit of 0.5 × 5 mm), with the results as shown in FIG. 1.

As is apparent from FIG. 1, the kallikrein according to Examples 6 and 7 of the present invention does not contain any of foreign proteins B, C, D, E and F, whereas the kallikrein obtained by the prior processes has entrained therein a material amount of foreign protein impurities.

The present invention will now be illustrated in more detail.

An autolysate, which can be obtained by treating animal organs by an ordinary method using, for example, a diluted acetic acid solution by a known method, is brought into contact with an anion exchange resin of a highly cross-linked macroporous type for adsorption of kallikrein in the resin. The resultant resin is then repeatedly washed with an electrolyte having a concentration of 0.25 M or less in order to remove lipides and foreign proteins from the resin, until no progressive changes in the protein absorbance in the washing at OD (optical density) 280 nm are observed. Thereafter, an electrolytic solution having a concentration of 0.6 M or more is used for dissolving out high purity kallikrein.

In order to have kallikrein absorbed on the ion exchange resin by the method of the present invention, the resin may be directly introduced into an autolysate of animal organs for adsorption in a bath system, or the autolysate may be passed through a column which is filled with the resin, i.e., by a column system, or a combination of a batch and a column system.

The ion exchange resin of a highly cross-linked macroporous type, which contains a tertiary amine as an exchange group, can be obtained by the treatment of an existing ion exchange resin for making it physically macro-porous and by introduction of a tertiary amine as an exchange group.

Examples of the ion exchange resin useful in the present invention include Diaion WA30, Imac A-20-R, Imac A-20-S (Imacti Industriele Maatschappij Actvit N.V.), Imac A-24 (Imacti Industriele Maatschappig Actvit N.V.), and the like.

The electrolytes suitable for the purposes of the present invention include an aqueous solution of an ammonium salt or an alkali metal (e.g. sodium or potassium) salt of an organic acid such as formic acid, acetic acid or the like, or of an ammonium salt or an alkali metal (e.g. sodium or potassium) salt of an inorganic acid such as hydrochloric acid, sulfuric acid, phosphoric acid or the like.

The electrolyte may be used either as a washing or as an eluant, depending upon its molar concentration. Furthermore, the pH value of the electrolyte is preferred to be within a range of 6.0 – 8.5 so as not to have adverse effects on kallikrein.

Though the thus obtained kallikrein may be provided in the form of powder for injections, the process of the present invention may be repeated to obtain kallikrein of higher purity, if necessary.

As is clear from the foregoing, in the present invention, highly pure kallikrein can be directly obtained from autolysate of animal organs or human urine without pretreatment by the use of the anion exchange resin of a highly cross-linked macro-porous type which contains a tertiary amine as an exchange group. Thus, the method of the present invention can greatly contribute to the industrial scale production of high purity kallikrein.

For comparative purposes, various aspects of the method of the present invention and the prior processes are summarized in Table 1 below. With regard to the process of Japanese Pat. No. 404256, experimental tests were conducted using kallikrein (having a specific activity of 7.77 ku/mg) which was obtained by the process of Japanese Pat. No. 130506.

TABLE 1

| | Comparison Between Method of Invention and Prior Process | |
|---|---|---|
| | Method of Invention | Process of Japanese Patent No. 130506 |
| Starting Material | Autolysate | Autolysate |
| Autolysation | Filtered after autolyzed at 15°C for 5 hours with 0.05N acetic acid. | Filtered after autolyzed at 37°C for 48–72 hours with 0.02N acetic acid. |
| Separation of Foreign Proteins | Different kinds of Proteins are adsorbed on Diaion WA-30, followed by washing proteins with use of 0.1–0.25 M ammonium chloride solution (having a pH value of 6.0–8.5). 8–12 hours required. | After addition of acetone in an amount equivalent to inner solution of dialysis, the resultant solution is allowed to stand for 8–12 hours for precipitation of kallikrein. |
| Isolation of Effective Component | Kallikrein is dissolved out with use of a 0.6–1.0 M ammonium chloride solution (having a pH value of 6.0–8.5). 8–12 hours required. | Kallikrein is extracted by means of a N/3 sodium bicarbonate solution and substances insoluble in the solution are sorted for removal. This process is repeated three times. 8–12 hours required. |
| Dialysis | Desalting and Dialysis. Time required: 48 hours | Desalting, and Dialysis. Time required: 48 hours |
| Specific Activity | 20.81 – 35.26 ku/mg | 4.47 – 13.59 ku/mg |
| Electrophoretic Chart | See FIG. 1 | See FIG. 1 |
| Yield | 80 – 94 % | 65 – 75 % |
| Feature | The anion exchange resin can be readily regenerated with semipermanent endurance. | A large amount of acetone is required and the recovery is difficult. |
| Operation | Easy. | Complicated. |

| | Method of Invention | Process of Japanese Patent No. 404256 |
|---|---|---|
| Starting Material | Kallikrein (and a solution of kallikrein) obtained by the method of the invention. | Kallikrein obtained by the process of Japanese Patent No. 130506 |
| Separation of Foreign Proteins | The above product is dissolved in a diluted salt solution (having a pH value of 7.0) and is adsorbed on Diaion WA-30, followed by washing with a dilute salt solution (having a pH value of 6.0–8.5) for removal of the foreign proteins. | Kallikrein is adsorbed on DEAE-cellulose which has been maintained in the state of equilibrium by means of a 0.01 M phosphate buffer solution having a pH of 7.0, followed by washing with a mixture of a 0.01 M phosphate buffer solution and a 0.4% sodium chloride aqueous solution for removal of the foreign proteins. |
| Isolation of Effective Component | Elution of effective component by means of a 0.6–1.0 M salt solution having a pH value of 6.0–8.5 | Elution of kallikrein effective component by means of a mixture of a 0.05 M phosphate buffer solution and a 5% sodium chloride aqueous solution, with a pH value of 7.0 |

TABLE 1-continued

Comparison Between Method of Invention and Prior Process

| | Method of Invention | Process of Japanese Patent No. 130506 |
|---|---|---|
| Dialysis | Desalting and Dialysis. | Desalting and Dialysis. |
| Specific Activity | 103.78 – 146.82 ku/mg | 38.86 – 92.88 ku/mg |
| Electrophoretic Chart | See FIG. 1. | See FIG. 1. |
| Yield | 95 – 96 % | 85 – 87 % |

Description is now directed to increases in dog blood flow rate caused by the use of kallikrein according to Examples 6 and 7 of the present invention and the processes of Japanese Pat. Nos. 404256 and 130506.

A predetermined amount of each sample was dissolved in a physiological saline solution, and the resultant solution was injected into an adult dog for determination of any increase in blood flow rate by a hind leg blood circulation method. The test results are shown in FIG. 2 in which the dosage amount is taken on the abscissa and the blood flow rate on the ordinate, the blood flow rate being plotted against the concentration of the respective samples.

As apparent from FIG. 2, the kallikrein obtained in Example 6 of the present application shows a 201 times greater blood flow rate or amount as compared with the kallikrein which is obtained by the process of Japanese Pat. No. 130506 and has almost the same effect as the kallikrein of Japanese Pat. No. 404256. Furthermore, the kallikrein of Example 7 of the present invention shows a 3.8 times greater blood flow amount as compared with the kallikrein of Example 6 and can attain a 3.13 times greater blood flow rate as compared with Japanese Pat. No. 404256.

The present invention will be particularly illustrated in the following Examples.

EXAMPLE 1

6 kg of pig's pancreas was cut into slices and was autolyzed in 20l of a 0.05 M acetic acid solution at 15°C for 5 hours with agitation. Then, the slices of pancreas and fat were removed from the solution by filtration, and the pH value of the filtrate was adjusted to 6.5. Thereafter, the resultant solution was introduced into a resin tower (6 × 70 cm) filled with Diaion WA-30 (1.4l) at a flow rate of 1.5 – 2.0l/hr. Then, a 0.25 M ammonium chloride solution (having a pH value of 6.5) was passed through the resin tower for washing the resin until the absorbance of the washing at OD 280 nm reached 1.0. Thereafter, the effective component was eluted out by means of a 0.8 M ammonium chloride solution (having a pH value of 6.5). The eluate was desalted by means of an ultrafilter and the resultant effective kallikrein component-containing solution was frozen and dried to yield 8.99 g of kallikrein (with a specific activity or purity of 20.76 ku/mg and a total activity of 186632.4 ku). The yield was 85% on the basis of pharmacologically effective components of the autolysate. Degree of purification was 1207 times greater than that of the autolysate.

EXAMPLE 2

1.58 g of the frozen and dried kallikrein powder (having a specific activity of 20.76 ku/mg) of Example 1 was dissolved in 50 ml of a 0.2 M ammonium chloride solution (having a pH value of 6.5). The resultant solution was again introduced into a resin tower (3 × 40 cm) filled with Diaion WA-30 (240 ml) at a flow rate of 200 – 300 ml/hour for adsorption, followed by washing with a 0.2 M ammonium chloride solution (having a pH value of 6.5) and then with a 0.3 M ammonium chloride solution (having a pH value of 6.5) until the absorbance of the washing at OD 280 nm reached 0.8. Thereafter, the effective component was eluted out by the use of a 0.6 M ammonium chloride solution (having a pH value of 6.5).

The resultant eluate was subjected to desalting by means of an ultrafilter and the resultant effective kallikrein component was frozen and dried to obtain 0.216 g of kallikrein (having a specific activity of 146.82 ku/mg and a total activity of 31708.8 ku). The yield was 96% and the degree of purification with regard to the original powder was 7.07 times greater.

EXAMPLE 3

120 g of pig's pancreas was treated in the same manner as in Example 1 to obtain an autolysate. The same procedure as in Example 1 was then repeated using Imac A 20R$^R$ for adsorption to yield 55 mg of kallikrein (which had a specific aciticty of 35.19 ku/mg and a total activity of 1936 ku). The yield was 96% and the degree of purification was 2046 times greater than that of the autolysate.

EXAMPLE 4

1.6l of urine of male adults was used as a starting material.

After adjustment of the pH value of the urine to 7.0, the solution was fed to a resin tower (25 × 25 cm) filled with Diaion WA-30 at a flow rate of 1l/hour for adsorption.

After completion of the adsorption, a 0.3 M ammonium chloride solution was passed through the tower, until the protein absorption OD 280 nm reached 0.7, for washing out and removing non-effective components from the resin. Then, a 0.8 M ammonium chloride solution (having a pH value of 6.5) was passed through the tower to obtain a kallikrein-containing solution.

The thus obtained solution was subjected to desalting treatment, frozen and dried to obtain 242 mg of kallikrein (showing a specific activity of 0.91 ku/mg and a total activity of 220 ku).

The degree of purification with regard to the orignal urine was 198 times greater.

EXAMPLE 5

1.5 kg of pig's pancreas was treated in the same manner as in Example 1 to obtain an autolysate, to which was added 300 ml of Imac A 20 S while agitating at 3° – 5°C for 2 hours in a batch system.

Then, the resultant solution was filtered to obtain the resin as a residue. The resin was washed by means of a 0.3 M ammonium chloride solution (having a pH value of 6.5) until the absorbance of the washing at OD 280 nm reached 1.9, and was further treated by means of a 0.8 M ammonium chloride solution (having a pH value of 6.5) to obtain a kallikrein-containing solution.

The thus obtained solution was subjected to a desalting treatment, followed by freezing and drying to yield 800 mg of kallikrein (having a specific activity of 17.70 ku/mg and a total activity of 14160.0 ku).

The yield was 94% and the degree of purification was 1072.7 times greater.

EXAMPLE 6

7.2 kg of pig's pancreas was autolyzed in 25l of a 0.05 N acetic acid solution at 15°C for 5 hours. Then, the autolysate was dropped for adsorption at a rate of about 1l/hour in a resin tower filled with about 900 ml of Diaion Wa 30 which had previously been saturated with 0.25 M ammonium chloride solution (having a pH value of 6.0) for removal of different kinds of proteins. The washing was stopped when the absorbance of the washing at OD 280 nm became smaller than 3. Then, the effective component of kallikrein was eluted by the use of a 0.8 M ammonium chloride solution (having a pH value of 6.0). The resultant solution was subjected to a desalting treatment, and to electrodialysis for partial concentration or filtration using a Dia-flow membrance filter, followed by freezing and drying to obtain 7.39 g of kallikrein (having a specific activity of 27.33 ku/mg and a total activity of 201968.7 ku).

The degree of purification was 3178 times greater with regard to the autolysate.

EXAMPLE 7

The kallikrein powder of Example 1 was dropped for adsorption into a resin tower (4.2 × 3.6 cm) filled with Diaion WA-30 (500 ml) at a flow rate of 1l/hour. After completion of dropping, the resin was washed with a 0.25 M ammonium chloride solution (having a pH value of 6.0), followed by eluting with a 0.8 M ammonium chloride solution (having a pH value of 6.0) to dissolve out a kallikrein-containing component. The resultant eluate was subjected to desalting and concentrating by dialysis or by the use of a Dia-flow membrane filter, followed by freezing and drying to obtain 1.0 g of kallikrein (having a specific activity of 103.78 ku/mg and a total activity of 103780.0 ku).

The degree of purification became 3.797 times greater with regard to the originally employed powder.

EXAMPLE 8

1 g of kallikrein powder (having a specific activity of 7.77 ku/mg) which was separated or isolated from an autolysate of pig's pancreas in accordance with the prior acetone precipitation process (as described in Japanese Pat. No. 130506) was dissolved in 50 ml of a 0.25 M ammonium chloride solution (having a pH value of 6.0). The resultant solution was dropped into a resin tower (having a size of 3 × 30 cm) filled with Diaion WA-30 (212 ml) at a flow rate of 200 – 250 ml/hr, followed by washing with a 0.25 M ammonium chloride solution (having a pH value of 6.0) and then dissolving out kallikrein by the use of a 0.6 M ammonium chloride solution (having a pH value of 6.0)

The resultant eluate was desalted, and frozen and dried to yield 168.5 mg of kallikrein powder having a specific activity of 43.072 ku/mg. The yield was 93.4% with regard to the original powder.

EXAMPLE 9

Kallikrein powder of Example 8 (having a specific activity of 43.072 ku/mg) was dissolved in 20 ml of a 0.2 M ammonium chloride solution (having a pH value of 6.0). The resultant solution was dropped into a resin tower (having a size of 2 × 60 cm) filled with Diaion WA-30 (188 ml) at a flow rate of 150 – 180 ml/hr for adsorption, followed by washing with 0.25 M ammonium chloride solution (having a pH value of 6.0) and eluting kallikrein by the use of a 0.6 M ammonium chloride solution (having a pH value of 6.0) to obtain kallikrein. The resulted eluate was desalted, and frozen and dried to yield 56.8 mg of kallikrein powder (having a specific activity of 121.7459 ku/mg). The yield was 95.28% with regard to the original powder.

What we claim is:

1. A method for the preparation of high purity kallikrein, which comprises contacting an autolysate obtained from organs of mammals, human urine or a low purity kallikrein-containing solution with a highly cross-linked macroporous type anion exchange resin having a tertiary amine as an exchange group for having kallikrein adsorbed in said anion exchange resin, and washing the kallikrein absorbed anion exchange resin with an electrolyte having a pH of 6.0 to 8.5 and a concentration of 0.25 M or less and eluting the kallikrein with an electrolyte having a pH of 6.0 to 8.5 and a concentration of 0.6M or more.

2. A method according to claim 1, wherein the highly cross-linked macro-porous type anion exchange resin having a tertiary amine as an exchange group is a styrenedivinylbenzene copolymer having the amine covalently bound to the benzene nucleus of the styrene radical.

3. A method according to claim 1, wherein the electrolyte is selected from a member consisting of ammonium and alkali metal salts of hydrochloric acid, sulfuric acid and phosphoric acid.

4. A method according to claim 3, wherein the electrolyte is an ammonium chloride solution.

* * * * *

UNITED STATES PATENT OFFICE
CERTIFICATE OF CORRECTION

Patent No. 3,929,757      Dated December 30, 1975

Inventor(s) Hiroshi Miyazakai, et al.

It is certified that error appears in the above-identified patent and that said Letters Patent are hereby corrected as shown below:

Column 2, line 54, the word "absorbed" should be --adsorbed--;
Column 5, line 2, the word "absorbed" should be --adsorbed--;
Column 9, line 11, the term "Wa" should be --WA--;
Column 9, line 21, the word "membrance" should be --membrane--.

Signed and Sealed this eighteenth Day of May 1976

[SEAL]

Attest:

RUTH C. MASON
Attesting Officer

C. MARSHALL DANN
Commissioner of Patents and Trademarks